(12) United States Patent
Smith

(10) Patent No.: US 6,477,539 B1
(45) Date of Patent: Nov. 5, 2002

(54) METHOD AND APPARATUS FOR INTERFACING A MANAGER AND A PLANT

(75) Inventor: Kevin W. Smith, Mississauga (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/217,910

(22) Filed: Dec. 22, 1998

(51) Int. Cl.[7] ............................................. G06F 17/00
(52) U.S. Cl. ............................ 707/103 R; 707/104.1
(58) Field of Search ....................... 707/1, 2, 3, 4, 707/100, 101, 102, 103, 104; 709/223, 224, 225, 226

(56) References Cited

U.S. PATENT DOCUMENTS

| | | | | |
|---|---|---|---|---|
| 5,181,162 A | * | 1/1993 | Smith et al. ................. | 364/419 |
| 5,295,242 A | * | 3/1994 | Mashruwala et al. ....... | 395/159 |
| 5,748,618 A | * | 5/1998 | Rothrock .................... | 370/260 |
| 5,778,227 A | * | 7/1998 | Jordan ........................ | 395/682 |
| 5,794,030 A | * | 8/1998 | Morsi et al. ................ | 395/614 |
| 5,878,421 A | * | 3/1999 | Ferrel et al. ................ | 707/100 |
| 5,893,107 A | * | 4/1999 | Chan et al. ................. | 707/103 |
| 5,950,006 A | * | 9/1999 | Crater et al. .................... | 717/5 |
| 5,983,234 A | * | 11/1999 | Tietjen et al. ............... | 707/103 |
| 6,003,037 A | * | 12/1999 | Kassabgi et al. ........... | 707/103 |
| 6,067,548 A | * | 3/2000 | Cheng ......................... | 707/103 |
| 6,119,122 A | * | 9/2000 | Bunnell ...................... | 707/102 |
| 6,119,125 A | * | 9/2000 | Gloudeman et al. ........ | 707/103 |
| 6,128,619 A | * | 10/2000 | Fogarasi et al. ............ | 707/102 |
| 6,144,962 A | * | 11/2000 | Weinberg et al. ............. | 707/10 |
| 6,201,996 B1 | * | 3/2001 | Crater et al. ................... | 700/9 |
| 6,208,955 B1 | * | 3/2001 | Provan et al. ................ | 703/20 |
| 6,247,128 B1 | * | 6/2001 | Fisher et al. ................ | 713/100 |

* cited by examiner

*Primary Examiner*—James P. Trammell
*Assistant Examiner*—Mary Wang

(57) ABSTRACT

An interface between a plant manager and a plant utilises object oriented programming concepts to create objects representing resources of the plant. Objects representing physical resources in the plant have a state, and automatically report this state to their parent objects. Logical objects, which are parents to other objects, determine their states based upon the states of their children, and report these to their own parent objects. At the head or apex of this hierarchy of objects is an initial object, whose state is the state of the plant as a whole. Operations, such as software upgrades or sparing of resources, may be implemented by the manager sending a command to the appropriate object, which will implement the command through its descendant objects. The success or failure of this attempt is then reported to the manager.

31 Claims, 6 Drawing Sheets

METHOD AND APPARATUS FOR INTERFACING A MANAGER AND A PLANT

FIELD OF THE INVENTION

This invention relates generally to a method and apparatus for interfacing a manager and a plant. In a particular embodiment, the invention relates to interfacing a manager and a network element in a communications system.

BACKGROUND OF THE INVENTION

A known architecture for a network element (NE) in a communications system comprises a pair of common equipment modules (CEMs) linked to a plurality of resource modules (RMs). One of the CEMs is active and provides the switching function through the network element; the other CEM is a spare. Some RMs may act as interfaces for incoming or outgoing lines. Incoming calls may be switched through other RMs for echo cancelling or to provide other call processing.

A network element has a manager to manage its component CEMs and RMs. The manager is typically implemented in software and provides an operator interface which allow an operator to send commands to any CEM or RM in the NE. The manager for a given NE may be coded by a third party (i.e., by other than the manufacturer of the NE).

A manufacturer of an NE may utilise CEMs and RMs from other equipment manufacturers (OEMs). This may result in different low level commands being appropriate for different resources (CEMs and RMs) in the NE. These low level commands burden the NE operator or require the manager to be programmed to translate higher level operator commands to commands appropriate for each resource. In any case, long series of low level commands are usually necessary to perform single operations; this consumes bandwidth and also increases the likelihood of errant commands. Furthermore, with such a system, a resource failure may have an immediate system-wide impact, yet reconfiguration of the system to take the resource off-line may be time consuming. Also, in many instances, the possible system-wide impact will be indeterminate, thereby necessitating immediate action to take a failed resource off-line even in instances where the resource failure actually causes little or no system-wide disruption. Finally, in such a system, the operator or programmer of the manager must invest time and effort to become familiar with the operation and capabilities of the NE and its component RMs and CEMs.

SUMMARY OF THE INVENTION

The present invention addresses these problems by providing an interface between a plant manager and the plant, where a "plant" may be any managed device or system. The interface utilises object oriented programming concepts to create objects representing resources of the plant. This allows the manager to specify one or more objects to effect an operation or obtain information in respect of resources of the plant.

In accordance with the present invention, there is provided a method for interfacing a manager with a plant, comprising: a) providing a parent object representing child objects, each child object representing at least one resource of said plant; b) accepting a command from said manager indicating said parent object and an operation; and c) attempting said operation in respect of resources represented by said child objects. The invention also provides for an interface and computer readable medium which effect this method.

In a particular embodiment of the invention, each child object includes an indicator of a current state of a resource represented by each child object and the parent object includes an indicator of a current state of the parent object, the parent object state indicator based on the child object state indicators.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of the invention.

DETAILED DESCRIPTION OF THE PREFERRED EMBODIMENT

Figure 1:
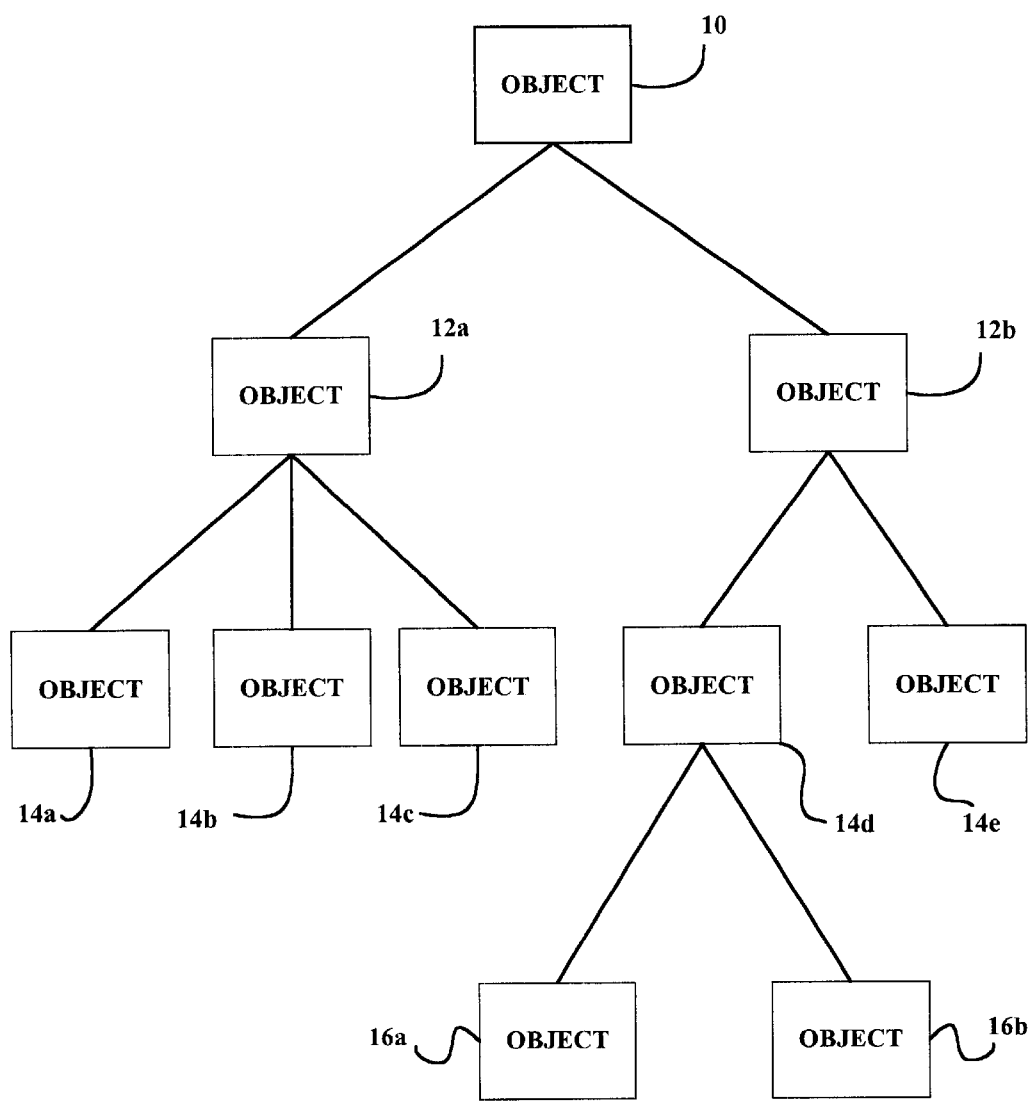
FIG. 1 is an exemplary block diagram illustrating concepts of object oriented programming.

"Object oriented" programming utilises programming constructs known as "objects". Multiple objects may be created to perform commands on discrete collections of data. Objects, known as "parents", may be created to perform commands on other objects, known as "children", creating a hierarchal structure. In this manner, programming complexity may be reduced, as code need only be created once for any given type of object. An exemplary object tree is illustrated in FIG. 1. Turning to FIG. 1, the objects are represented by boxes. An initial or master object 10 is at the apex of the hierarchical structure. Object 10 is also called the parent object to objects 12a and 12b, and objects 12a and 12b are therefore the child objects to object 10. Similarly, objects 14a, 14b and 14c are in a parent/child relationship to object 12a; objects 14d and 14e are in a parent/child relationship with object 12b; and objects 16a and 16b are in a parent/child relationship with object 14d. Objects 14a, 14b, 14c, 14d and 14e are known as the grandchildren of object 10, and object 10 is known as the grandparent of objects 14a, 14b, 14c, 14d and 14e.

Finally, objects 12a, 12b, 14a, 14b, 14c, 14d, 14e, 16a and 16b are called the descendants of object 10. Similarly, objects 14d, 14e, 16a and 16b are the descendants of object 12b. Commands which are sent to a first object are implemented by the first object on itself and are passed on to its children, who in turn implement the command upon themselves and pass the command on to their children. As a result, a command sent to a first object is automatically implemented in all of the first object's descendants, as well as in the first object itself. In this manner, programming is also simplified as one command given to a parent object is automatically implemented on all descendent objects of the parent object.

The interface of the present invention utilizes object oriented programming to move complex programming tasks from the level of the management software to the level of the plant interface, resulting in the availability of a simplified and limited spectrum of high-level commands to the manager.

With the present invention, commands may be sent from the manager to selected parent objects in the interface. If the parent object is in an operational state (as discussed further below), the parent object will implement the command on itself (if appropriate). The parent object will also implement the command instructions on its children objects if these are in an operative state. In this manner, the command is implemented on the operative descendent objects of the parent. The commands are eventually implemented at the level of objects which directly represent the physical resources of the NE. These "physical" objects are at the end or base of the hierarchy of objects. The success or failure of the command is reported to the manager by the parent object to which the command was originally sent.

As well, all physical objects continuously inform their parents whether they are in an operational state. In turn, each parent object decides whether enough of its children are operational for the parent object to itself be operational and implement commands. The parent object sends this information to its parents, who make a similar decision. The state of any object thus reflects an assessment of the operability of any physical resources that are its descendants.

This results in a number of advantages over systems where the manager itself interfaces with the resources of the NE, as follows:

- Operability may be directly queried at the level of logical groupings or functions rather than at the level of discrete resources. The analysis of operability is performed in the interface rather than by the manager.
- Complex operations such as software upgrades, sparing or state changes may be completed by the manager sending one command to the appropriate object, rather than many individual commands to the individual resources.
- The removal or addition of equipment in the NE may be handled gracefully by the interface.
- Differences in commands between equipment of different manufacturers is handled in the interface, and the manager does not need to concern itself with such issues.

Consequently, a manager for an NE provided with an interface in accordance with this invention is less complex to write, has less chance of issuing errant commands, and has lower bandwidth demands.

The subject interface performs two basic functions: provisioning the platform, consisting of the steps of identifying an equipment list and creating the hierarchy; and state indication. In addition, the objects may accommodate several secondary operations.

Provisioning the Platform

Figure 2:
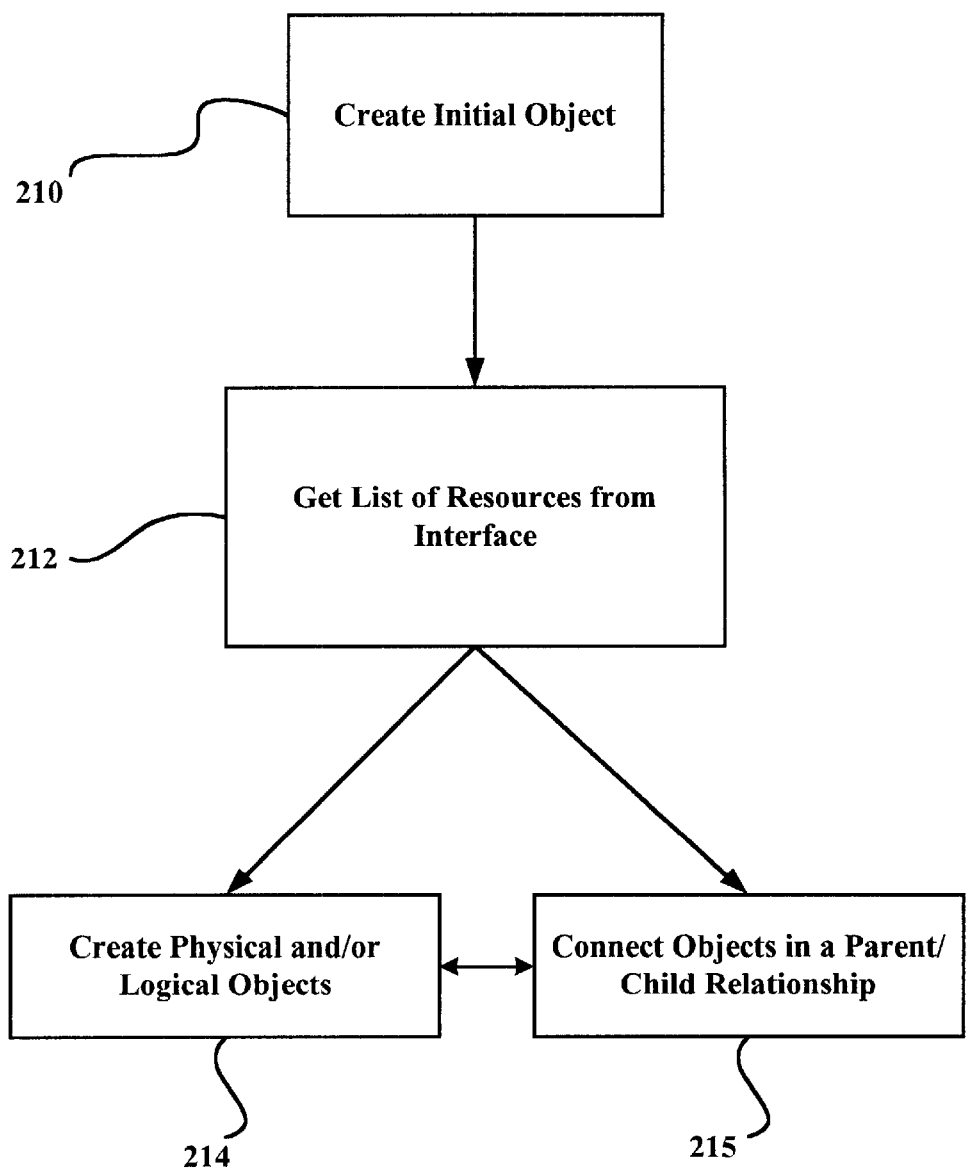
FIG. 2 is a flow diagram of a method of provisioning an interface in accordance with the invention.

The basic steps of provisioning the platform are illustrated in FIG. 2. Turning to FIG. 2, the provisioning of the platform involves the interface creating an initial object (step 210). This can be accomplished during factory set-up of the interface or by appropriate commands from the manager. Either before or after creation of the initial object, the interface may receive a request from the manager for a list of resources available in the NE and respond to same (step 212). This is followed by the interface receiving and responding to commands to create logical and physical objects (step 214) and connect them in a hierarchical or object tree structure (step 215). Provisioning is detailed in the following two sections.

Identifying the Equipment List

One of the available commands that the manager may issue to the interface is a request to return a list of available resources (RMs and CEMs) in the plant. This command may have the following format:

sapi.send(getEquipmentList);

The interface will return a set of pointers to the resources of the NE which permit the manager to identify the available resources.

Creating the Hierarchy

The interface allows the manager to construct and alter a platform or tree of objects to control the RM and CEM resources of the NE. As a first step, the interface allows the creation of an initial object, which will be a parent to all subsequent objects. This initial object serves two functions: it is a conduit for commands intended to access all the resources of the NE, and it indicates the state of the NE, as is discussed more fully hereinafter. This initial object, as well as much of the object platform or hierarchy, may be extant in the interface before it is shipped to the customer. However, the interface allows the manager to alter the object tree, and the manager could even erase a pre-defined object tree and build a new one.

The manager may issue an "addChild" command which instructs the interface to create an object and add it to the interface as a child for a specified object, such as the initial object. Generally, these children will be "logical" objects that represent some logical function of the plant (e.g. echo cancelling). In turn, the interface may create further logical objects that are children of the children of the initial object, also known as the grandchildren of the initial object. In this manner, there can be several levels of logical objects created in the hierarchical structure. Generally, there will be several different types of "logical" objects that can be created.

The interface must also be provisioned with children objects that represent the physical resources of the plant. These objects are known as "physical" objects. Again, there may be several types of physical objects corresponding to different physical resources of the plant.

At the end of this platform provisioning, the logical and physical objects will form a hierarchy of objects residing in the interface. Although not absolutely necessary, the following guides will lead to acceptable system behaviour:

- a logical CEM object must exist as a child of the initial object
- a physical CEM object must exist as a child of the logical CEM object
- at least one logical RM object must exist as a descendent of the initial object
- all physical RM objects should exist as children of a logical RM object.

Examples of different types of objects are the following:

physical objects—represent physical resources of the plant. Includes both CEM and RM objects logical CEM objects logical RM objects—can be subdivided into RMs that interface communication lines to the NE, and RMs that provide services within the NE logical fault object—collects information on faults in the NE, and responds to queries regarding faults from the manager logical event forwarding object—will not pass on certain events to its children or back to the manager (e.g. the object may filter out fault messages that do not effect the operation of the system)

logical container objects—simply accept and pass on commands to its children, and report its state as discussed hereinafter. The initial object is of this type.

logical timeswitch objects—represent timeswitch functions within the NE logical sparing objects—represent sparing groups of RMs or CEMs logical pool objects—allow management of "pools" of resources, such as RMs An example of pseudo-code to create a physical CEM object is as follows:

```
SapiCemMocParms cemparms;              //creates a variable called cemparms suitable
                                       // to hold information to specify a physical
                                       // CEM object
cemparms.slot = 7;                     // specifies the physical slot of the NE in
                                       // which the CEM is located
cemParms.load = "TcuCem3G-007";        // specifies the software that the CEM should
                                       // be running (an error is generated if this
                                       // does not match the actual CEM's software)
cemParms.release = "January 1, 2000";  // specifies the release number of the software
                                       // that the CEM should be running (an error
                                       // is generated if this does not match the
                                       // actual CEM's software)
cemParms.name = "myCem";               // allows the manager to give the object a
                                       // unique name
cemparms.type = SapiMocType::cem;      // specifies the type of physical object to
                                       // create
sapi.send(createMoc, cemparms);        // creates the physical CEM object
```

An example of pseudo-code to firstly add the logical CEM object called "logicalCemMocRef" as a child of the initial object and to secondly add the physical CEM object called "mycem" as a child of the logical CEM object called "logicalCemMocRef" is as follows:

```
initMocRef.send (addChild, logicalCemMocRef;    // adds logical object CemMocRef as a
                                                // child of the initial object
logicalCemMocRef.send(addChild, myCem);         // adds object myCem as a child of
                                                // logicalCemMocRef
```

Figure 3:
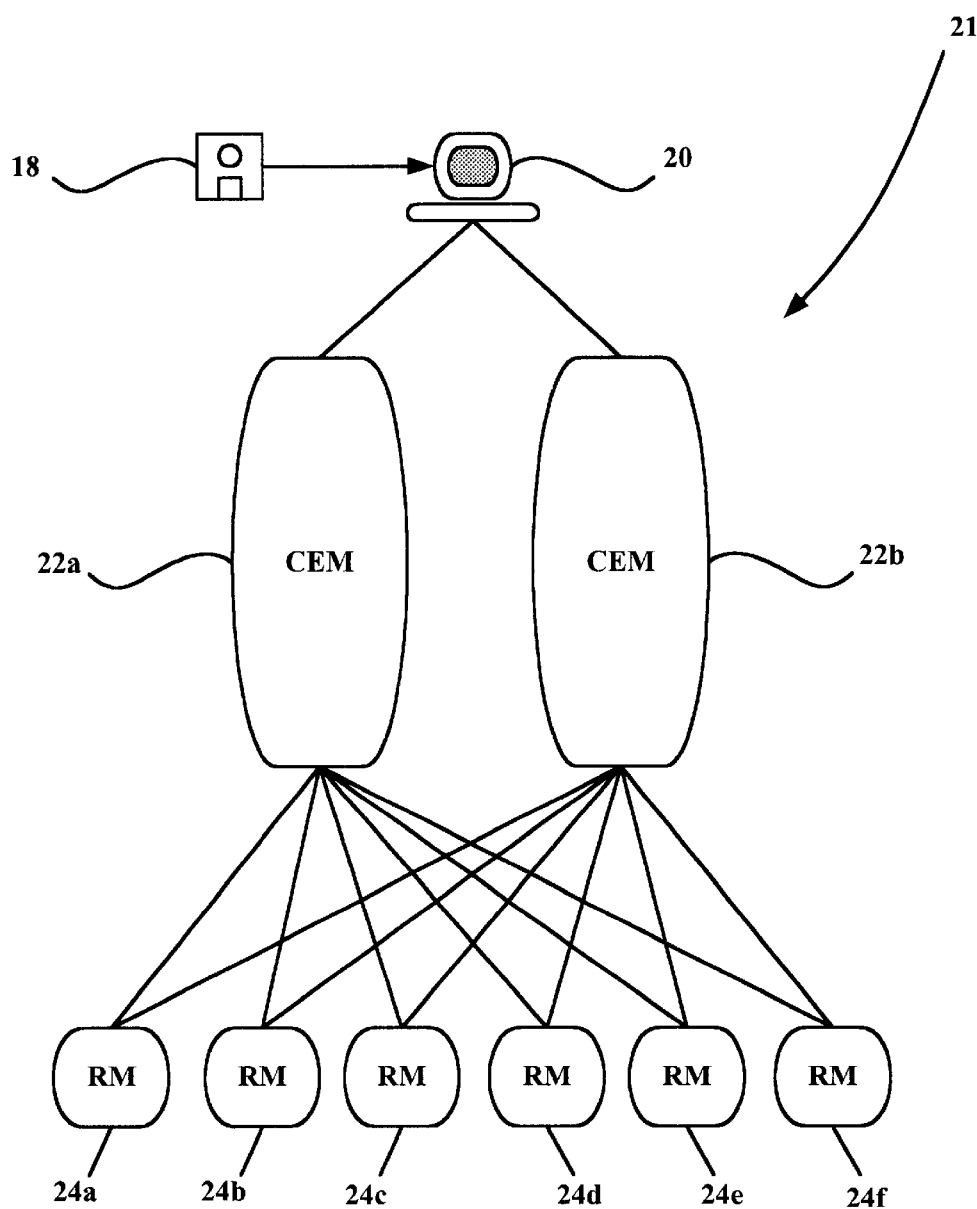
FIG. 3 is a block diagram of an example of a provisioned interface in accordance with this invention.
Figure 4:
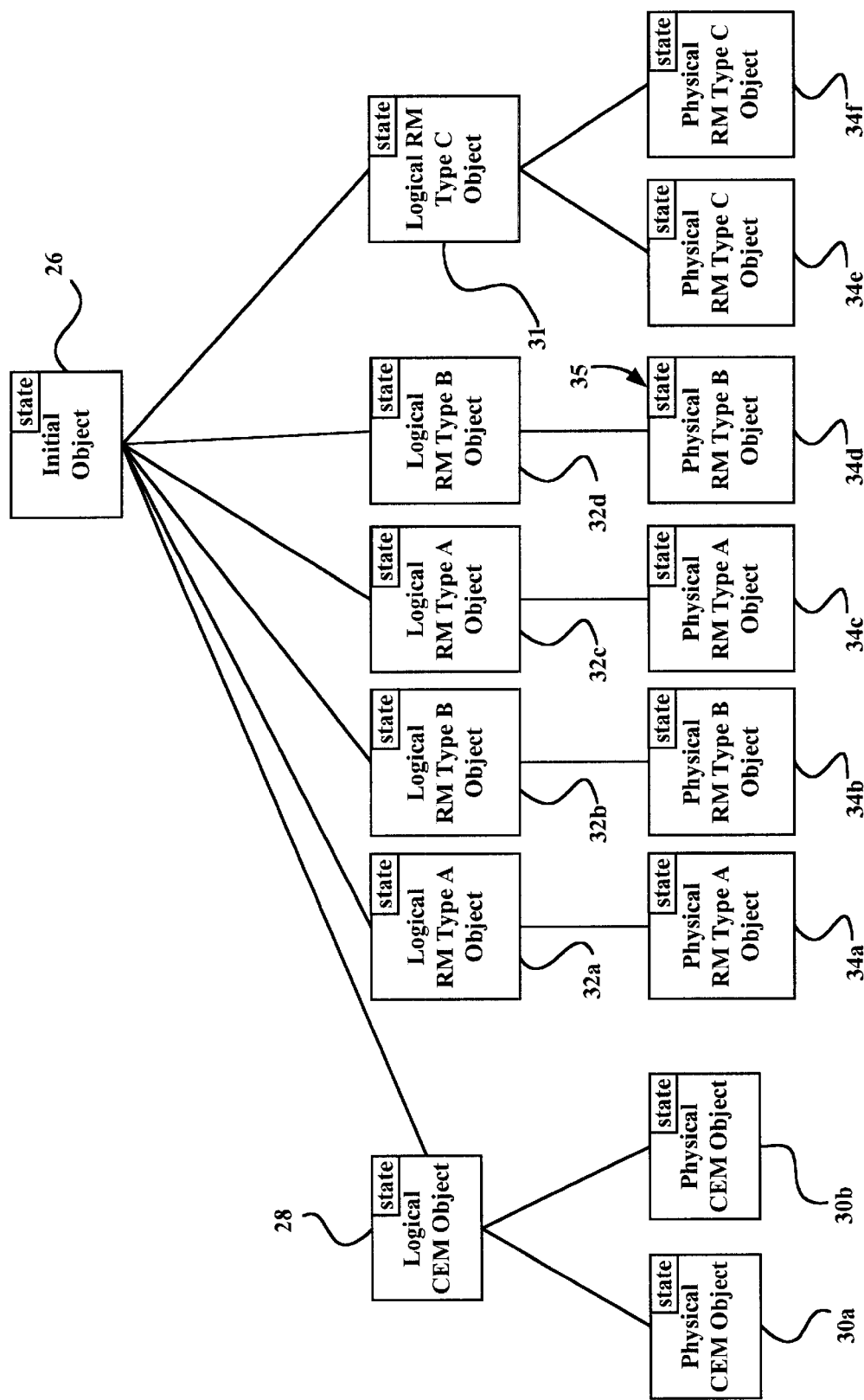
FIG. 4 is a block diagram of another example of a provisioned interface in accordance with this invention.
Figure 5:
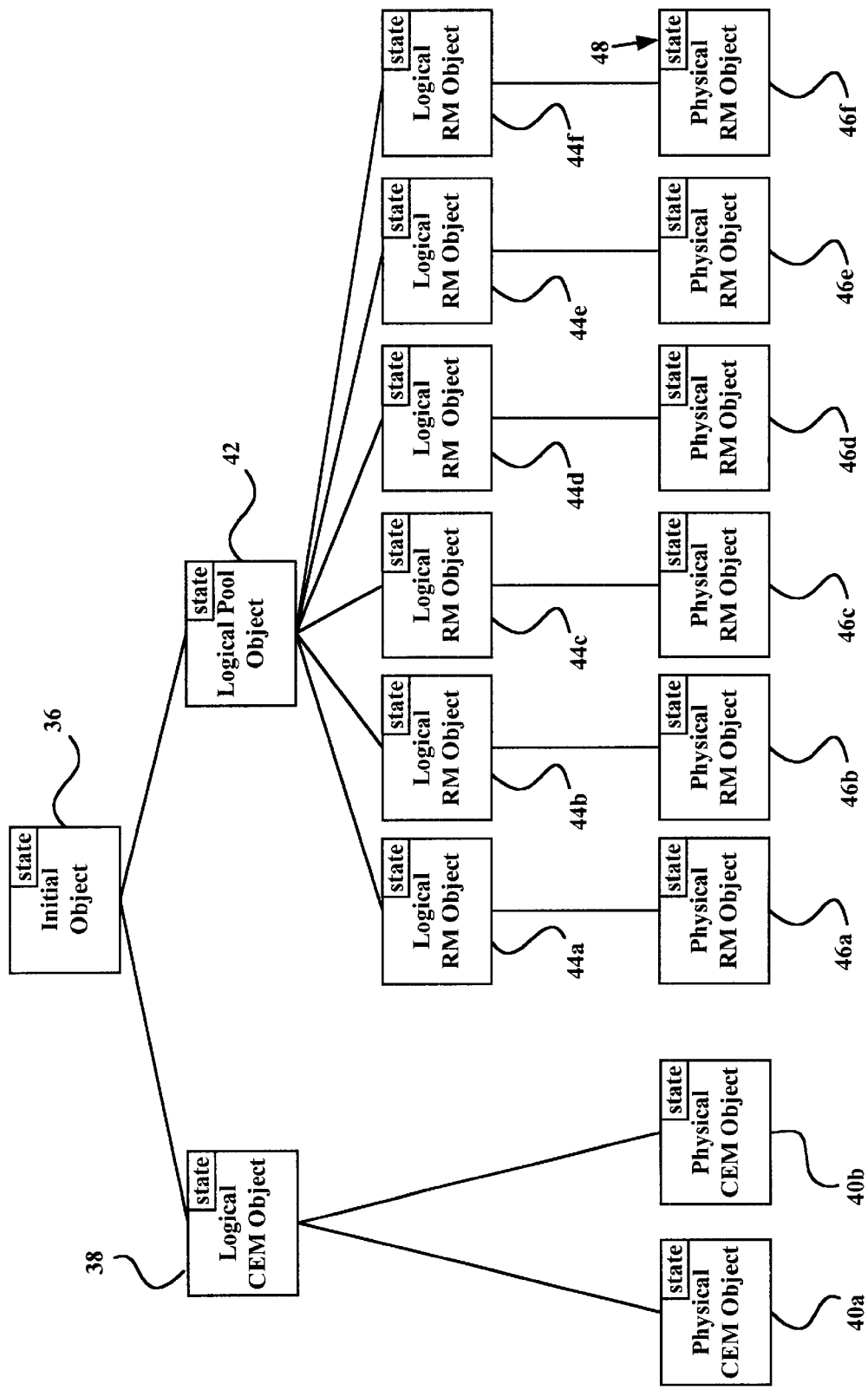
FIG. 5 is a schematic diagram of an example Network Element.

Example platforms which may be created in the interface for the NE illustrated by FIG. 3 are illustrated in FIGS. 4 and 5. Turning first to FIG. 3, an operations, maintenance and administration (OA&M) station 20 for NE 21 is connected to CEMs 22a and 22b, one of which is in service and the other of which is a spare. Each of these CEMs is connected to RMs 24a, 24b, 24c, 24d, 24e, and 24f. The OA&M station 20 may be loaded with a software interface in accordance with this invention via software medium 18. Additionally, a manager may be loaded into the OA&M stations via another software medium. While software medium 18 is illustrated as a computer diskette, it could equally be a tape, memory chip, or other removable computer readable medium. Furthermore, the software medium may be a remote medium, such as a memory of a remote computer, and be downloaded over a suitable link such as over an internet, intranet, dedicated data link, or the like.

Via appropriate provisioning commands from the manager to the interface, a possible platform setup in the interface, assuming that RMs 24a and 24c are RMs of type "A", RMs 24b and 24d are RMs of type "B", and RMs 24e and 24f are RMs of type "C" and are spared, is illustrated in FIG. 4. Turning to FIG. 4, initial object 26 has as a child logical CEM object 28, which in turn has physical CEM objects 30a and 30b as children representing CEM 22a and 22b respectively. The initial object 26 is also the parent to logical RM objects 32a, 32b, 32c, 32d, and 31. The logical RM objects are of types corresponding to the physical resources they represent: thus, objects 32a and 32c are logical RM type A objects; objects 32b and 32d are logical RM type B objects; and object 31 is a logical RM type C object. Object 32a is parent to object 34a, the physical RM object representing RM 24a; object 32b is parent to object 34b, the physical RM object representing RM 24b; object 32c is parent to object 34c, the physical RM object representing RM 24c; object 32d is parent to object 34d, the physical RM object representing RM 24d; and object 31 is parent to objects 34e and 34f, the physical RM objects representing spared RMs 24e and 24f, respectively. It will be appreciated that RMs of a given type are those with a common attribute. For example, RMs of type "A" might be those which act as an interface to communication lines from outside the NE. Also, as described below, physical RMs 34a, 34b, 34c, 34d, 34e and 34f have a state indicated at 35 that represents the state of corresponding resources 24a, 24b, 24c, 24d, 24e and 24f. These states are reported to logical RM objects 31, 32a, 32b, 32c and 32d, which from this information determine their own state. Similarly, the states of physical CEM objects 30a and 30b determine the state of logical CEM object 28. In turn, the states of logical RM objects 31, 32a, 32b, 32c and 32d as well as logical CEM object 28 determine the state of initial object 26.

A second possible platform setup, assuming that RMs 24a, 24b, 24c, 24d, 24e and 24f are of the same type and operate as a pool, is illustrated in FIG. 5. With a pool of resources, each resource in the pool is capable of carrying out the same type of commands. Turning to FIG. 5, initial object 36 has as a child logical CEM object 38, which in turn has as children physical CEM objects 40a and 40b representing CEMs 22a and 22b respectively. Initial object 36 is also the parent of logical pool object 42, which in turn is the parent of logical RM objects 44a, 44b, 44c, 44d, 44e and 44f. Finally, logical RM objects 44a, 44b, 44c, 44d, 44e and 44f are the parents of physical RM objects 46a, 46b, 46c, 46d, 46e and 46f, respectively. Since this platform is appropriate for the case where all the RMs are of the same type, logical RM objects 44a, 44b, 44c, 44d, 44e and 44f will be of the same type, as will physical RM objects 46a, 46b, 46c, 46d, 46e and 46f. Again, each of physical RM objects 46a, 46b, 46c, 46d, 46e and 46f have a state indicated at 48 which corresponds to the operability of RMs 24a, 24b, 24c, 24d, 24e and 24f. These states are reported to and determine the state of logical RM objects 44a, 44b, 44c, 44d, 44e and 44f. The states of logical RM objects 44a, 44b, 44c, 44d, 44e and 44f, in turn, are reported to logical pool object 42, which determines its own state from this information. Similarly, the state of logical CEM object 38 is determined from the states of physical CEM objects 40a and 40b, and the state of initial object 36 is determined from the states of logical CEM object 38 and logical pool object 42.

Operational State Indicators

As noted, plant resources have a "state". This state has two subdivisions: an "operational" state and an "administrative" state. The administrative state is either "locked" or "unlocked", indicating whether the resource is available to provide its normal function. The operational state is either "disabled" or "enabled", indicating whether the resource(s) represented by the object are operable. For a resource, or an object representing resources of the plant, to be available for the implementation of an operation sent by the manager, it must be in an appropriate state. Some operations require the object to be "unlocked", some require the object to be "enabled", while other operations require the object to be both "unlocked" and "enabled". Furthermore, as will be more fully described later, an operation may be implemented differently for a given object depending upon that object's state.

Objects in the interface include an indicator of the state of the object. The physical objects' state will reflect the state of the NE resources that they represent. The state of a parent object, in turn, will be determined by the state of its children objects. The specific relationship between the state of the parent and its children depends upon the specific type of the parent object. This greatly simplifies the analysis of operability of the NE: instead of querying the operability and availability of each physical resource in the NE and then analysing these to see if the NE is operational, the manager can send one query to the "initial" object to see if the plant as a whole is operational. Similarly, queries can be sent to specific objects to see if the functions or physical resources they represent are operational and available.

For example, an object may represent a "pool" of available RMs as illustrated in FIG. 5. Turning to FIG. 5, the number of RMs 24a, 24b, 24c, 24d, 24e and 24f needed for a given pool to function may be factory pre-set and this number may be reset by the manager. An RM in the pool may change to a disabled state through a fault developing in the RM. In such a case, the object representing the RM, say object 46a, will reflect this change of state (normally after conducting a routine status diagnostic check). Alternatively, a RM in the pool may be changed to a locked state through an appropriate software command to the object which represents it. Although some of the RM's represented by physical RM objects 46a, 46b, 46c, 46d, 46e and 46f may be non-operational, the pool as a whole may be able to function. Instead of querying each of physical RM objects 46a, 46b, 46c, 46d, 46e and 46f as to their operability and performing an analysis to see if a sufficient number are operational to allow the pool to function, the manager can send one query to the logical pool object 42, which represents the pool, to determine the pool's state. This reduces the complexity of the programming of the manager, reduces bandwidth and reduces the possibility of programming error.

Operations

The parent/child structure of the interface allows many operations to be more easily and efficiently performed by the manager. The operation command need only be sent to the appropriate parent object, which will then implement the operation among its descendent objects. The basic structure for the implementation of operations is illustrated in FIG. 6.

Figure 6:
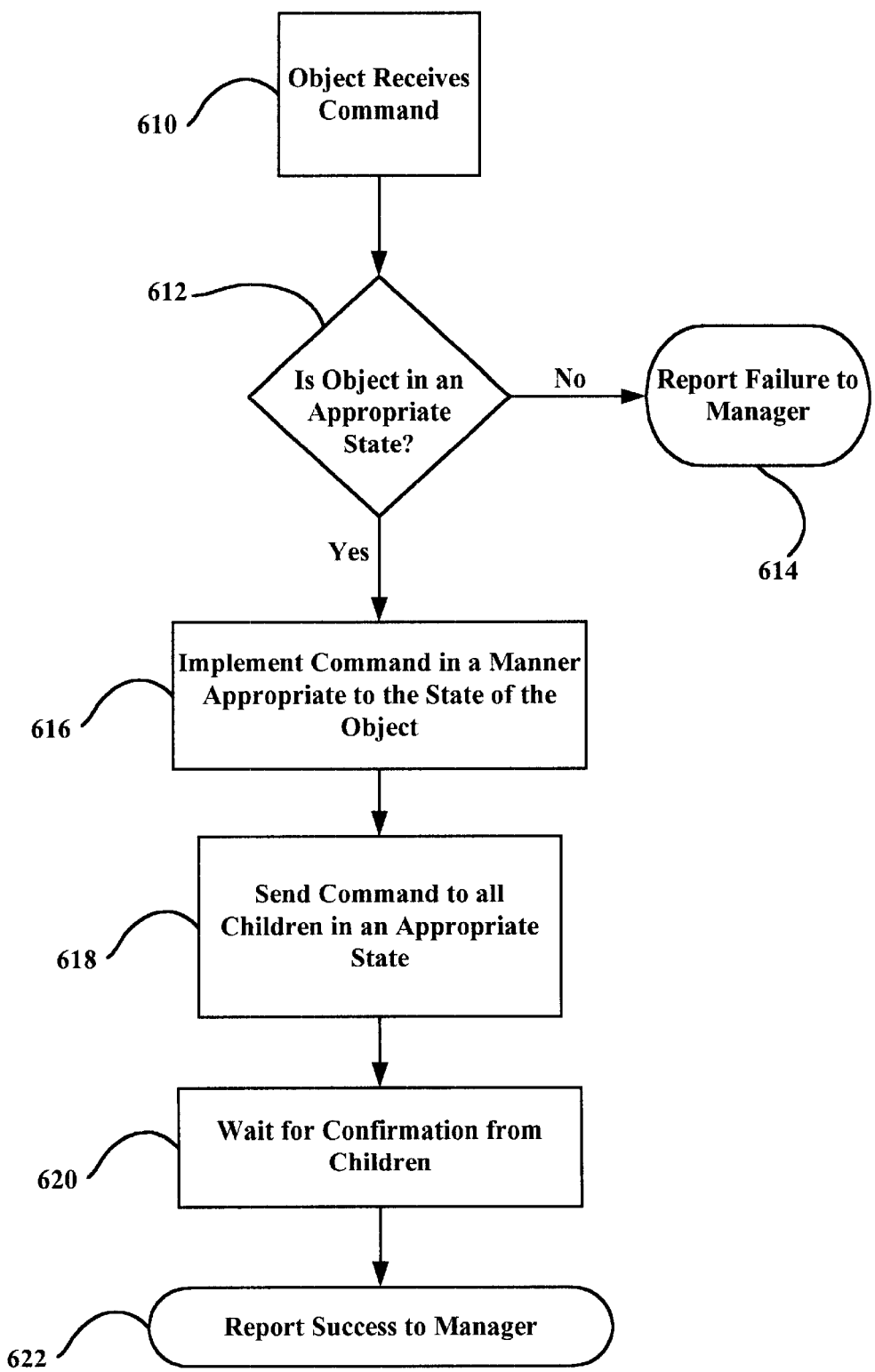
FIG. 6 is a flow diagram of a method of an object implementing a command in accordance with the invention.

Turning to FIG. 6, the object first receives a command to perform an operation (step 610). If the object is not in an appropriate state to perform the operation (step 612), a failure signal is returned to the manager (step 614). If the object is in an appropriate state, the object implements the command on itself in a manner appropriate to its state, assuming that this is a necessary part of the operation (step 616). (For example, an operation to test the operability of the object may be programmed to more intrusively manipulate the resources represented by an object if the object is locked and not available for use, and less intrusively manipulate the resources if the object is unlocked and is potentially in use.) The command is then passed on to all of the children of the object that are in an appropriate state (step 618). Once the object receives confirmation from its children that the operation is successful (Step 620), this success is reported to the manager (step 622).

It will be appreciated by those skilled in the art that the step of sending the command to the children of the object may be modified, if necessary, to properly implement the operation in the case of a sudden failure of one of the children.

The supported operations include the following:

State Change

For various reasons, the manager will wish to place resources of the NE into either a "locked" or "unlocked" administrative state. For example, to replace equipment, the manager will first need to place the equipment into a "locked" state so that the NE will not attempt to use that equipment while running. The equipment may then be replaced, after which the state of this equipment is returned to an "unlocked" state.

As with all listed operations, one command sent to an object of the interface will implement the state change operation for all children of the object. The objects should also send a confirmation signal to the manager. An example of pseudo-code to unlock a logical CEM object named myCem is as follows:

```
SapiStateChangeData newState;     // defines a variable called newState
newState.state.adminState = SapiAdminState::unlocked;   // specifies that we wish to
                                                        // change the state to unlocked
newState.force = false;   // specifies that we do not wish to force the state change if
                          // the state change is disallowed for some reason
myCem.send(stateChange, newState);
```

Sparing or Protection

The interface has provision for sparing or protection commands. In communication applications, the operator usually wishes to ensure that there are sufficient back-up or spare resources available to allow the NE to continue to function despite the failures of some of the NE's resources. For example, suppose that the operator wishes to identify an RM to perform a specific task, and set up a second RM as a spare. This process could include the following steps:

Create a logical RM object

Create physical RM objects for the two RMs as children of the logical RM object

Send a command to unlock the logical RM object. As noted above, this will also unlock the physical RM children of the logical RM object.

Send a spare command to the logical RM object.

The user may either designate the children physical RMs to use as a spare and primary, or let the logical RM object internally designate one of the children physical RM objects as the primary RM, and the other as a spare. A command sent to the object MyGroup letting the interface choose may take the following form:

```
MyGroup.send(spare, SapiSpareType::uncontrolled);   // where "uncontrolled" means
                                                    // that the decision as to which
                                                    // RMs are spares is controlled
                                                    // internally by the object
                                                    // MyGroup
```

Note that if the logical RM object is allowed to choose the spare and primary RMs, the manager need not be concerned with which of the physical RMs is used as a spare, and there is no need for the interface to communicate this information to the manager. By way of example, referencing FIG. 4, RMs of type C are represented by logical RM object 31. If the spare command has been properly implemented, one of RMs 24e and 24f, represented by objects 34e and 34f, will be used as the primary RM, while the other will be the spare. The choice between the RMs and their ongoing control may be left to the logical RM type C object 31.

Connections

An NE creates cross-connections between different channels in the NE. To create a communications link between two channels, first, the manager will ask the interface to create a logical Timeswitch object. Then, the manager can command the logical Timeswitch object to link the channels, specifying the source and destinations channels:

```
SapiXConnect xc;            // Create a structure of type SapiXConnect called "xc"
SapiChannelIdfrom;          // Create a structure of type SapiChannelId called "from"
SapiChannelId to;           // Create a structure of type SapiChannelId called "to"
from.slot = 8;              // Specify the slot variable in the "from" structure as 8
from.link = 10;             // Specify the link variable in the "from" structure as 10
from.channel = 5;           // Specify the channel variable in the "from" structure as 5
to.slot = 8;                // Specify the slot variable in the "to" structure as 8
to.link = 11;               // Specify the link variable in the "to" structure as 11
to.channel = 6;             // Specify the channel variable in the "to" structure as 6
xc.fromEnd = from;          // Specify the fromEnd variable in the "xc" structure as
                            // "from"
xc.toEnd = to;              // Specify the toEnd variable in the "xc" structure as "to"
myTs.send(createXc, xc);    // Creates the cross connection with the information in xc
```

Monitor Faults

The objects may be configured to monitor their children for faults. When a fault occurs, the object may be configured to report this to the manager. The object can also be configured to handle the faults in various ways. For example, an object could attempt to restart the faulty child at regular intervals. Alternatively, when a fault occurs, the object could be designed to perform a diagnostic upon all of the children objects to detect systemic faults that are not isolated to a particular resource.

Perform a Software Upgrade

A task which can consume considerable resources of the manager and bandwidth is installing software upgrades. Instead of sending multiple upgrade signals to the individual resources of the NE, the interface allows the manager to send one command to an object, which will then attempt to upgrade the software for all its children objects. Where the children object represent physical resources, this results in a software upgrade of these resources. Simple pseudo-code to implement this is as follows:

```
SapiLoadParms parms;                           // creates a variable parms of type
                                               // SapiLoadParms
parms.loadName = "myCemLoad";                  // creates a name for this load
parms.loadPath = "/spectrum/loads/cem";        // says where the software to be loaded
                                               // is located
parms.loadProtocol = SapiLoadProtocol::lapd;   // determines the load protocol
parms.serverAddress = "47.173.49.26";          // sets the server address
emCemProxy.send(loadDev, parms)                // tells the object emCemProxy to load
                                               // software using the instructions found
                                               // in parms
```

Resetting Resources

The interface includes commands to reset or reinitialize children objects and resources.

Report Common Attribute

The interface allows the manager to query an object to determine the common attribute amongst its children. For example, referencing FIG. 5, logical object 42 may represent all the echo cancellers 46a, 46b, 46c, 46d, 46e and 46f in the NE. A query from the manager to logical object 42 asking what the common attribute of its children is should reply that the children are all echo cancellers. A command sent to the object MyGroup letting the interface choose may take the following form:

MyGroup.send(IdentifyCommonAttribute); //Wait for Reply

Delete Objects

To allow the object tree to change over time, the interface allows the manager to delete objects. Note that it is preferable that the software protocol not permit a parent object to be deleted until all its descendent objects are deleted.

Reprogramming

Finally, to allow the interface to be changed dynamically without shutting the NE down, the interface should allow the objects to be reprogrammed. (This is simply a type of software upgrade, as discussed previously.)

While the interface of the invention has been described as an interface between a NE manager and an NE, the interface may equally be adapted to interfaces between other plant managers and plants. For example, the plant may be a managed chemical process plant, airplane or other aerospace vehicle, or a nuclear power generator.

Other modifications within the spirit of the invention will be apparent to those skilled in the art.

What is claimed is:

1. A method for interfacing a manager with a plant, comprising:

a) providing a parent object representing child objects, each child object representing at least one resource of said plant;

b) accepting a command from said manager indicating said parent object and an operation; and c) attempting said operation in respect of resources represented by said child objects, wherein each child object includes an indicator of a current state of a resource represented by said each child object and wherein said parent object includes an indicator of a current state of said parent object, said parent object state indicator based on said child object state indicators.

2. The method of claim 1 wherein said child objects represent resources having a common attribute and further comprising, upon said plant acquiring a given resource having said attribute, adding a new child object such that said new child object represents said given resource and said new child object is represented by said parent object.

3. The method of claim 2 further comprising, upon a resource represented by a given child object being removed from said plant, removing said given child object from the child objects represented by said parent object.

4. The method of claim 2 wherein said operation is a diagnostic analysis to report said common attribute of said parent object.

5. The method of claim 1 wherein step c) of attempting said operation comprises attempting said operation in respect of each resource represented by t child object having a state indicator indicating a state of unlocked and enabled.

6. The method of claim 5 further comprising reporting a result of undertaking step c) to said manager.

7. The method of claim 6 wherein step a) of providing a parent object representing child objects further comprises:

accepting a request for a resource list from said manager;

responding with a current resource list;

accepting requests to create a parent object and have it represent child objects, with child objects in said class representing ones of resources in said resource list; and responding by providing said parent object representing child objects.

8. The method of claim 7 further comprising providing at least one further grandparent object representing parent and/or child objects, each parent and/or child object representing at least one resource of said plant and wherein step b) comprises accepting a command from said manager indicating said grandparent object and an operation and step c) comprises attempting said operation in respect of resources represented by said parent and/or child objects.

9. The method of claim 8 further comprising the deletion of at least one object.

10. The method of claim 1 wherein each child object represents one resource.

11. The method of claim 1 wherein at least one child object represents a plurality of resources.

12. The method of claim 1 wherein said operation is changing the state of the resources of said child objects, and further comprises changing the state of said parent object.

13. The method of claim 1 wherein said operation is an upgrade of software for the resources represented by said child objects.

14. The method of claim 1 wherein said operation is a resetting of the resources represented by said child objects.

15. The method of claim 1 wherein said operation is a continuous diagnostic and management of the state of the resources represented by said child objects.

16. The method of claim 1 wherein said operation is reprogramming of the parent object to provide the parent object with different methods for carrying out operations.

17. The method of claim 1 wherein the plant is a network element in a communications system.

18. The method of claim 1 embodied as instructions on some form of software medium, including a computer diskette, tape, memory chip, or other removable computer readable medium; as well as instructions embodied on remote mediums such as the memory of a remote computer, and downloaded over a suitable link such as over an internet, intranet, dedicated data link, or the like.

19. The method of claim 1 wherein said operation is a diagnostic analysis of the operability of the resources of said child objects and further comprising updating the current state of said parent object responsive to the operability of the resources of said child objects.

20. The method of claim 1 wherein said operation is a sparing of resources represented by said child objects.

21. An interface between a manager and a plant; comprising
   a) means for the provision of a parent object representing child objects, each child object representing at least one resource of said plant;
   b) means for accepting a command from said manager indicating said parent object and an operation;
   c) means for attempting said operation in respect of resource represented by said child objects;
   d) means whereby each child object includes an indicator of the current state of a resource represented by said each child object; and
   e) means whereby said parent object includes an indicator of the current state of said parent object, said parent object state indicator based on said child object state indicators.

22. The interface of claim 21 wherein said child objects represent resources having a common attribute and further comprising means for, upon said plant acquiring a given resource having said attribute, adding a new child object such that said new child object represents said given resource and said new child object is represented by said parent object.

23. The interface of claim 22 further comprising means for, upon a resource represented by a given child object being removed from said plant, removing said given child object from the child objects represented by said parent object.

24. The interface of claim 21 wherein the means c) for attempting said operation comprises means for attempting said operation in respect of each resource represented by a child object having a state indicator indicating a state of unlocked and enabled.

25. The interface of claim 24 further comprising means to report the result of undertaking means c) to attempt said operation to said manager.

26. The interface of claim 25 wherein the means a) for the provision of a parent object representing child objects further comprises:
   means to accept a request for a resource list from said manager;
   means to respond with a current resource list;
   means to accept requests to create a parent object and have it represent child objects, with said child objects representing ones of resources in said resource list; and
   means to respond by providing said parent object representing child objects.

27. The interface of claim 26 further comprising means to provide at least one further grandparent object representing parent and/or child objects, each parent and/or child object representing at least one resource of said plant and wherein means b) comprises means to accept a command from said manager indicating said grandparent object and an operation and means c) comprises means to attempt said operation in respect of resources represented by said parent and/or child objects.

28. The interface of claim 27 further comprising means for the deletion of at least one object.

29. The interface of claim 21 wherein each child object represents one resource.

30. The interface of claim 21 wherein at least one child object represents a plurality of resources.

31. A computer readable medium storing computer executable instructions comprising:
   a) means for the provision of a parent object representing child objects, each child object representing at least one resource of said plant;
   b) means for accepting a command from said manager indicating said parent object and an operation; and
   c) means for attempting said operation in respect of resource represented by said child objects,
wherein each child object includes an indicator of a current state of a resource represented by said each child object and wherein said parent object includes an indicator of a current state of said parent object, said parent object state indicator based on said child object state indicators.

* * * * *

UNITED STATES PATENT AND TRADEMARK OFFICE
CERTIFICATE OF CORRECTION

PATENT NO.    : 6,477,539 B1
DATED         : November 5, 2002
INVENTOR(S)   : Kevin W. Smith It is certified that error appears in the above-identified patent and that said Letters Patent is hereby corrected as shown below:

Column 12,
Line 23, "by t child" should be changed to -- by a child --;

Column 13,
Line 19, "resource represented by" should be changed to -- resources represented by --;

Column 14,
Line 35, "resource represented by" should be changed to -- resources represented by --;

Signed and Sealed this

Twenty-third Day of September, 2003

JAMES E. ROGAN
*Director of the United States Patent and Trademark Office*